United States Patent
Edelmann et al.

[11] Patent Number: 6,155,719
[45] Date of Patent: Dec. 5, 2000

[54] LINEAR GUIDE ASSEMBLY WITH POSITIVELY GUIDED CAGE

[75] Inventors: Ludwig Edelmann, Sulzthal; Andreas Geyer, Mainberg; Hermann Glöckner; Georg Hierl, both of Schweinfurt; Holger Kristandt, Euerbach; Uwe Mayer, Münnerstadt; Henryk Velde, Werneck; Lothar Walter, Schweinfurt, all of Germany

[73] Assignee: SKF GmbH, Germany

[21] Appl. No.: 09/287,687

[22] Filed: Apr. 7, 1999

[30] Foreign Application Priority Data

Apr. 7, 1998 [DE] Germany .......................... 198 15 526

[51] Int. Cl.⁷ .................................................. F16C 29/04
[52] U.S. Cl. ................. 384/51; 74/465; 74/110; 384/47
[58] Field of Search .................. 384/47, 51; 74/465, 74/110

[56] References Cited

U.S. PATENT DOCUMENTS

| | | | |
|---|---|---|---|
| 860,536 | 7/1907 | Ellingham | 74/465 |
| 2,294,665 | 9/1942 | Jackson | 384/47 |
| 2,408,666 | 10/1946 | Mallard | 74/465 |
| 5,427,454 | 6/1995 | Tsuboi | 384/47 |

FOREIGN PATENT DOCUMENTS

| | | |
|---|---|---|
| 1 192 462 | 12/1959 | Germany . |
| 892596 | 12/1959 | United Kingdom . |

*Primary Examiner*—Thomas R. Hannon
*Attorney, Agent, or Firm*—Eugene E. Renz, Jr., PC

[57] ABSTRACT

Linear guide assembly comprising at least two guide rails, which are movable in the longitudinal direction with respect to each other having similarly shaped raceways, a plurality rolling elements, guided in a cage, at least one gear wheel connected to the cage for the positive guidance of the cage, which wheel engages in toothed racks or the like, each of which is connected to a guide rail, said gear wheel consisting of a disk, having an external circumference which is provided with uniformly distributed axial rolling elements, which project slightly beyond the disk, and wherein said recesses, correspond to the external shape of the rolling elements and into which the rolling elements can engage, are provided equal distances apart directly in the guide rails.

13 Claims, 5 Drawing Sheets

LINEAR GUIDE ASSEMBLY WITH POSITIVELY GUIDED CAGE

BACKGROUND OF THE INVENTION

The present invention relates to a linear guide assembly having two guide rails which are moveable with respect to each other in the longitudinal direction, and having two facing raceways, between which rolling elements are guided in a cage. To achieve the positive guidance of the cage, at least one gear wheel is connected to the cage. This gear wheel engages in toothed rack or the like, connected to each guide rail.

To prevent the cage from wandering as a result of external influences such as nonuniform clamping or as a result of internal influences such as very small deviations in the shape of the raceways, it is known in the field of linear guides that the cage can be positively guided with respect to the guide rails. For this purpose, the cage is provided with gear wheels, which engage in racks installed between the guideways (DE-PS 1,192,462). In these known designs, the racks are made as separate parts, which must be attached to the guide rails or their supports by screws. This is complicated and expensive. There is also the problem of fitting these toothed racks into standard designs with standardized dimensions. Both the gear wheels and the toothed racks must be designed with a relatively complicated toothed profile, which also increases the cost of production.

SUMMARY OF THE INVENTION

It is the task of the present invention to create a linear guide of the general type described above with positive guidance of the cage, in which the toothed profiles are designed with a very simple and easy-to-produce profile.

To this end, in accordance with the present invention, the gear wheel consists of a disk, on the outside circumference of which rolling elements are uniformly distributed. These rolling elements project slightly beyond the disk. Rows of uniformly spaced recesses, corresponding to the external surfaces of the rolling elements, are provided directly in the guide rails, into which recesses the projecting parts of the disk can engage. As a result of these measures, it is possible to use standard commercial rolling elements for the gear wheel.

According to additional features of the invention, the rolling elements can be either balls or rollers, especially cylindrical rollers or barrel-shaped rollers, which are mounted either immovably or rotatably in recesses in the outside circumference of the disk.

According to another feature of the invention, the rollers can be provided with convex, preferably spherical, end surfaces. The gear wheel formed in this way can, in accordance with additional features of the invention, be inserted easily into one of the pockets of the cage or into a separate housing, which can be installed between sections of the cage or at the ends of the cage.

The recesses in the guide rails, which, according to additional features of the invention, can extend over the entire length of the guide rails or only over certain sections of them, can be produced either by plastic deformation such as a rolling or pressing operation or by cutting methods such as erosion, milling, or the like. These recesses do not have to be very deep, which means that the cross sections of the guide rails are not weakened significantly and are therefore not at risk of fracture. Thus, a compact and simple construction is obtained, because there is no need for the attachment of separate toothed racks or the like.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE METHOD AND SYSTEM

Figure 1:
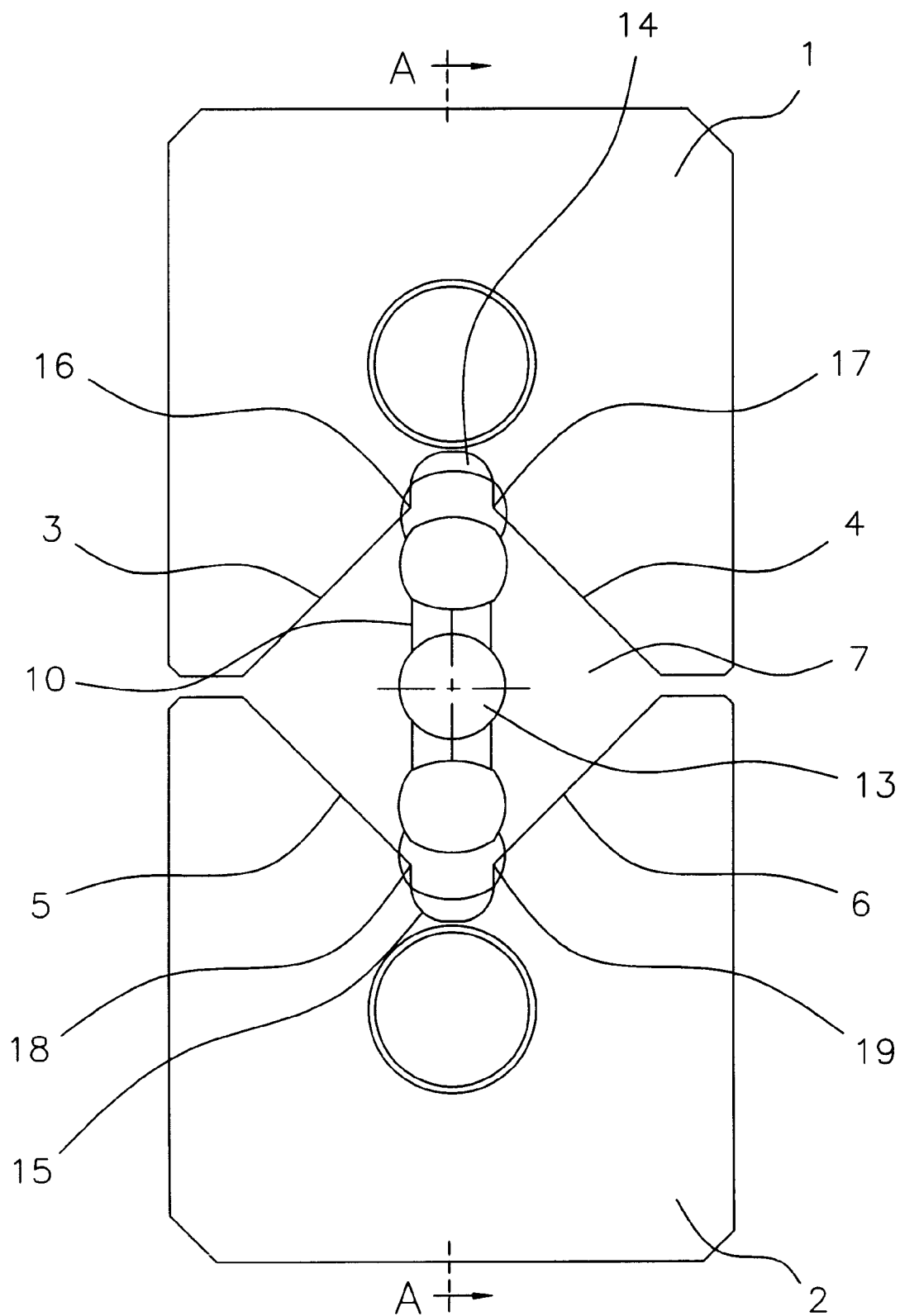
FIG. 1 shows a cross section through a linear guide according to the invention.
Figure 2:
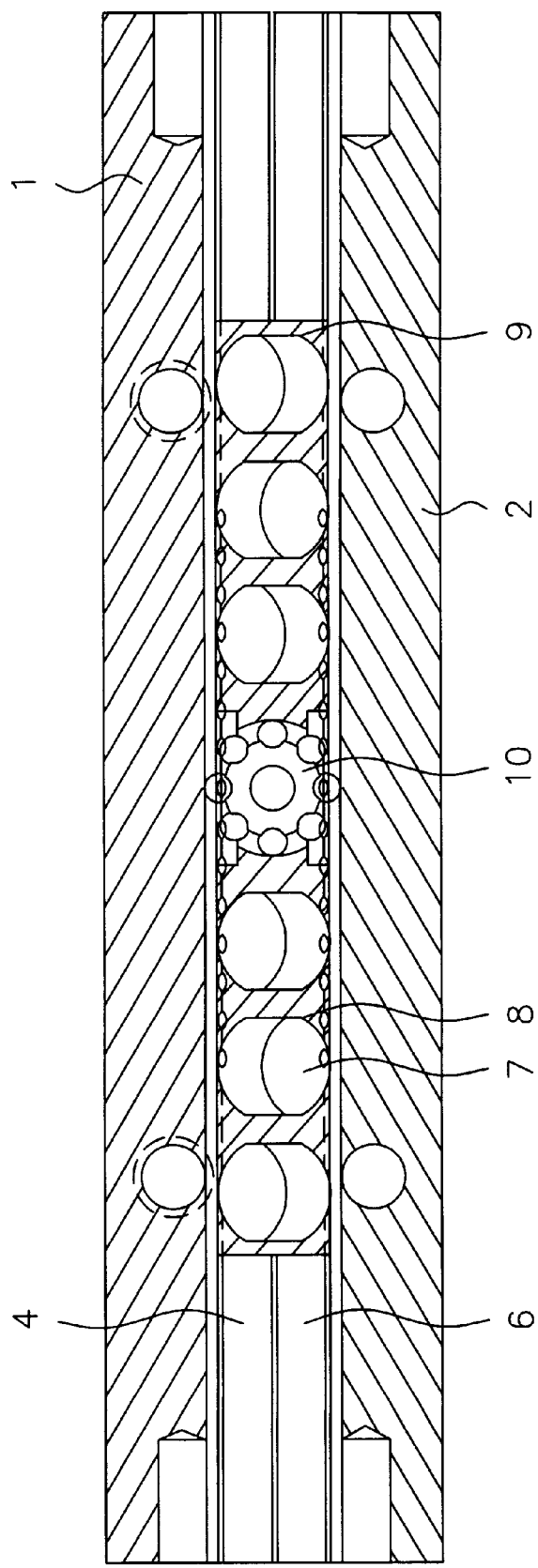
FIG. 2 shows a partial view of a longitudinal cross section along line A—A of FIG. 1.

Referring now to the drawings and particularly to FIG. 1, thereof, there is shown a linear guide assembly generally designated by the letter G1. The linear guide assembly comprises upper and lower guide rail 1 and 2, each of which has two prismatically shaped raceways 3, 4, 5, 6. Roller 7 are disposed between the prismatic raceways, which are arranged crosswise in alternate directions, one roller 7a thus contacting raceways 3 and 6, the next adjacent roller 7b contacting raceways 4 and 5, to transfer the forces applied to the linear guide. The rollers 7 are held in pockets 8 of a cage 9. In one of the pockets 8 of cage 9, a gear wheel 10 is installed, which consists of a disk 11, around the outside circumference 12 of which rolling elements in the present instance, balls 13, are uniformly distributed. These balls project slightly beyond external circumference 12 and also beyond the end surfaces of gear wheel 10.

Figure 3:
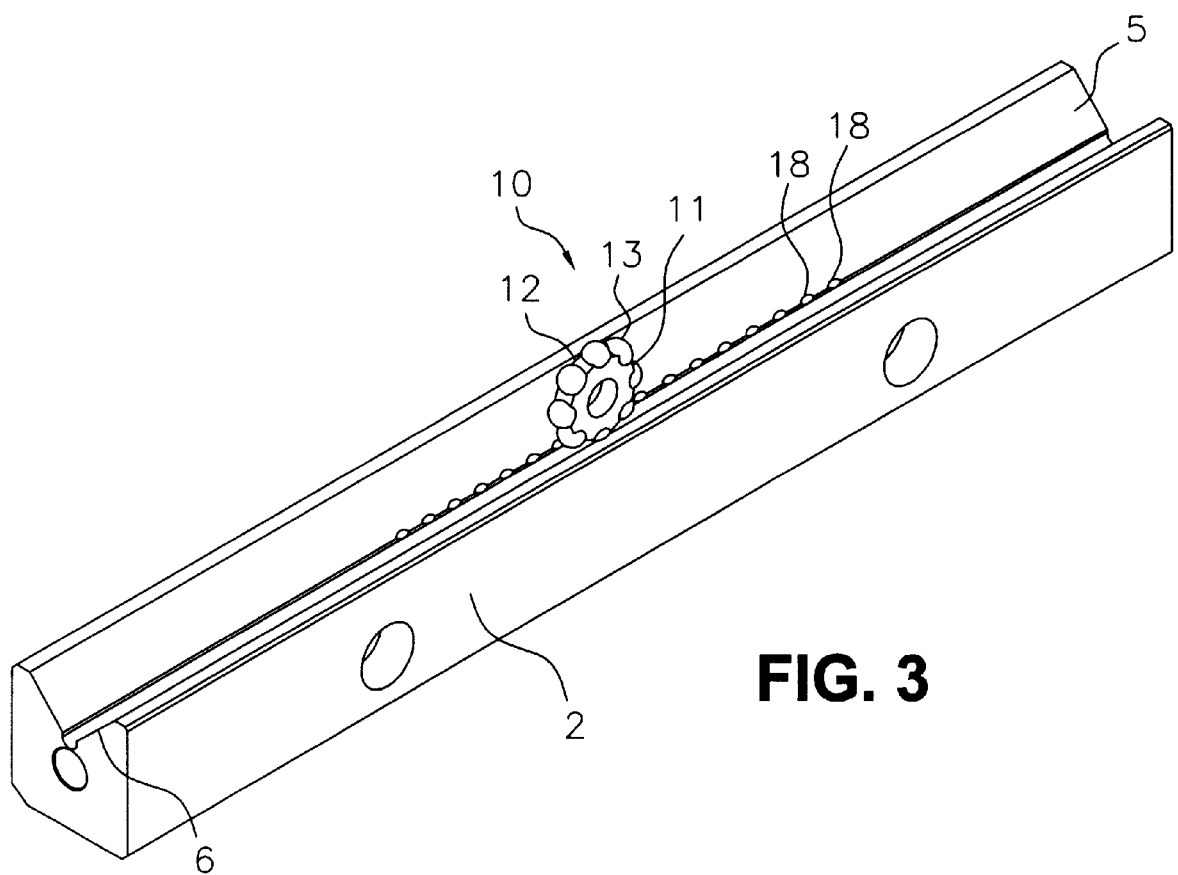
FIG. 3 shows a plan view, in perspective, of the lower guide rail according to FIGS. 1 and 2.
Figure 4:
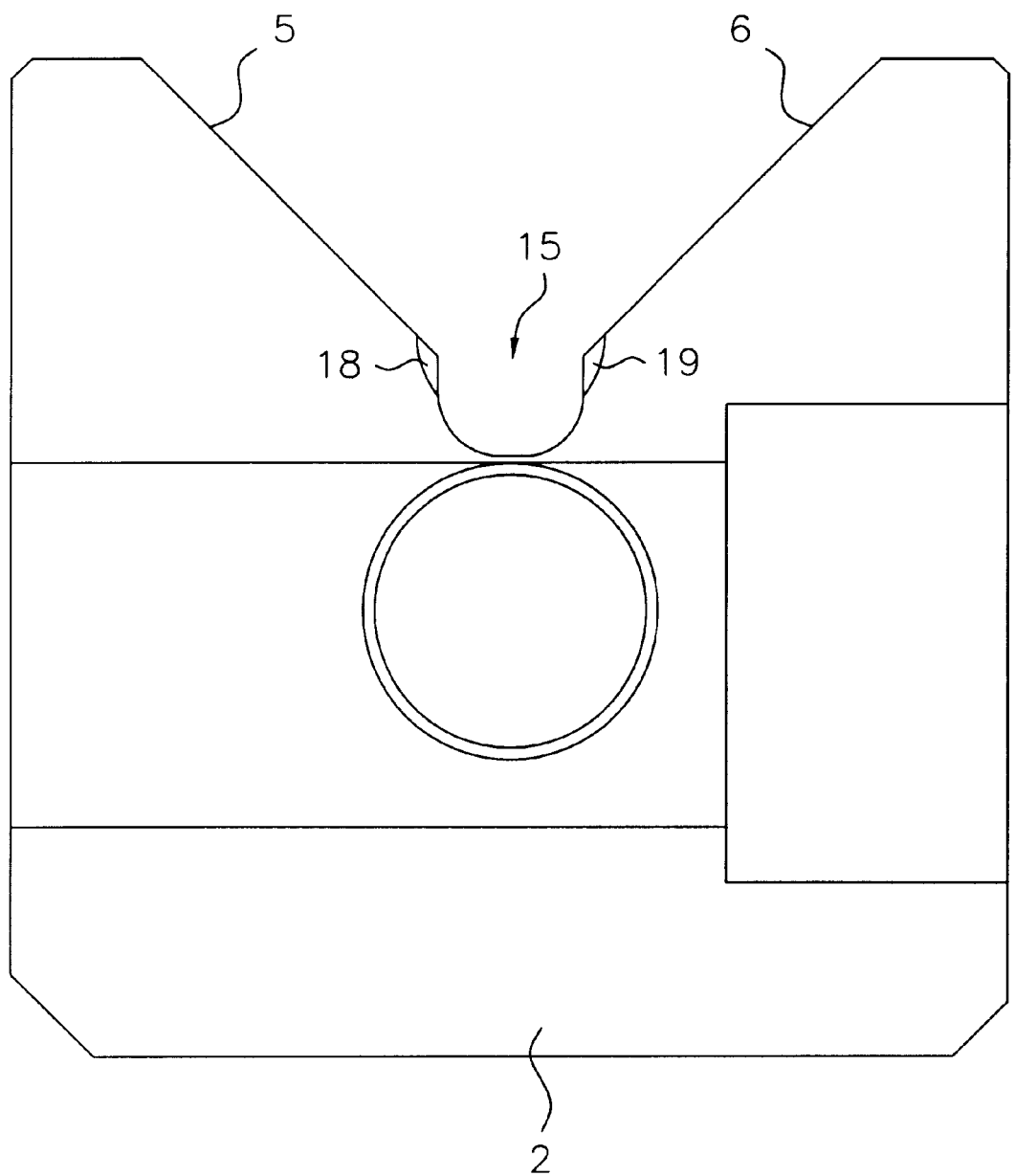
FIG. 4 shows an enlarged end view of the lower guide rail according to FIG. 3.

Each of the two guide rails 1, 2 is provided with a longitudinal groove 14, 15 at the intersection between the raceways 3, 4; 5, 6. Recesses 16, 17; 18, 19, the shape of which corresponds to the external surface of balls 13 and into which balls 13 can engage, are machined equal distances apart into the transition regions between raceways 3, 4; 5, 6 and longitudinal grooves 14, 15 (see FIGS. 1 and 3). Balls 13 thus mesh with recesses 16–19, so that cage 9 is positively guided when guide rails 1 and 2 move with respect to each other.

Figure 5:
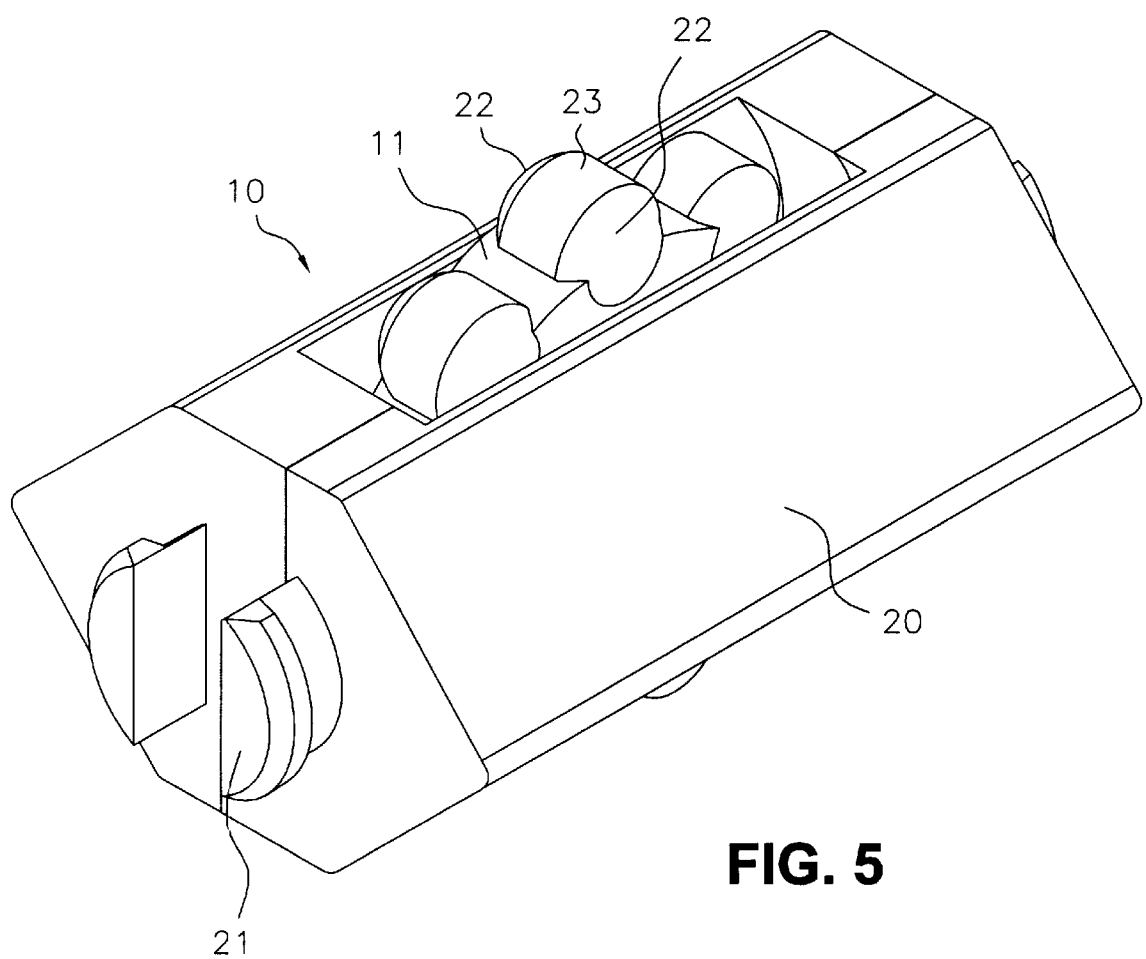
FIG. 5 shows a plan view, in perspective, of a different exemplary embodiment, in which the gear wheel is installed in a separate housing.

In the exemplary embodiment according to FIG. 5, gear wheel 10, consisting of disk 11 and rollers 23 with convex end surfaces 22, is installed in a separate housing 20, the external contour of which conforms to that of the prismatic raceways (not shown). Both ends of this housing 20 are provided with connecting means 21, which can be used to connect housing 20 to the cage (not shown).

Even though particular embodiments of the present invention have been illustrated and described herein, it is not intended to limit the invention and changes and modifications may be made therein within the scope of the following claims.

What is claimed is:

1. Linear guide assembly comprising at least two guide rails, which are movable in the longitudinal direction with respect to each other having similarly shaped raceways, a plurality of first rolling elements (7), guided in a cage (8), at least one gear wheel (10) connected to the cage for the positive guidance of the cage, said wheel (10) engaging in toothed racks, each of which is connected to a guide rail, said gear wheel (10) consisting of a disk (11), having an external circumference (12) which is provided with uniformly distributed second axial rolling elements (13, 23), which project slightly beyond the disk (11), and recesses (16, 17, 18, 19), spaced equal distances apart directly in the guide rails (1, 2), said recesses corresponding to the external shape of said second rolling elements (13, 23) and into which the second rolling elements (13) can engage.

2. Linear guide assembly according to claim 1, wherein said second rolling elements (13,23) project slightly beyond the external circumference (12) of the disk (11).

3. Linear guide assembly according to claim 1, wherein said second rolling elements (13, 23) project slightly beyond both end surfaces of the disk (11).

4. Linear guide assembly according to claim 1, wherein balls (13) are used as the second rolling elements for the gear wheel (10).

5. Linear guide assembly according to claim 1, wherein as said second rolling elements (23) cylindrical rollers or barrel-shaped rollers are used.

6. Linear guide assembly according to claim 1, wherein said second rolling elements (23) are provided with convex end surfaces (22).

7. Linear guide assembly according to claim 1, wherein said second rolling elements (13, 23) are attached with freedom of rotation to the disk (11).

8. Linear guide assembly according to claim 1, characterized in that the gear wheel (10) is installed in a pocket (8) of the cage (9).

9. Linear guide assembly according to claim 1, characterized in that the gear wheel (10) is mounted in a separate housing (20).

10. Linear guide assembly according to claim 1, wherein said recesses (16, 17, 18, 19) in the guide rails (1, 2) are provided over the entire length of the guide rails (1, 2).

11. Linear guide assembly according to claim 1, wherein said recesses (16, 17, 18, 19) are arranged over only part of the guide rails (1, 2).

12. Linear guide assembly according to claim 1, wherein said reuses (16, 17, 18, 19) are introduced into the guide rails (1, 2) by plastic deformation.

13. Linear guide assembly according to claim 1, wherein said recesses (16, 17, 18, 19) are introduced into the guide rails (1, 2) by a cutting operation.

* * * * *